(12) United States Patent  (10) Patent No.: US 9,167,932 B2
Lassota  (45) Date of Patent: Oct. 27, 2015

(54) DUAL-PURPOSE BREWER AND BREW BASKET AND METHOD OF BREWING

(75) Inventor: Zbigniew G. Lassota, Long Grove, IL (US)

(73) Assignee: FOOD EQUIPMENT TECHNOLOGIES COMPANY, INC., Lake Zurich, IL (US)

( * ) Notice: Subject to any disclaimer, the term of this patent is extended or adjusted under 35 U.S.C. 154(b) by 515 days.

(21) Appl. No.: 12/891,328

(22) Filed: Sep. 27, 2010

(65) Prior Publication Data

US 2011/0081466 A1  Apr. 7, 2011

Related U.S. Application Data

(60) Provisional application No. 61/246,502, filed on Sep. 28, 2009, provisional application No. 61/257,665, filed on Nov. 3, 2009, provisional application No. 61/259,838, filed on Nov. 10, 2009.

(51) Int. Cl.
*A47J 31/04* (2006.01)
*A47J 31/06* (2006.01)

(52) U.S. Cl.
CPC .......... *A47J 31/0615* (2013.01); *A47J 31/0605* (2013.01)

(58) Field of Classification Search
USPC ......... 219/284, 290, 299, 304, 305, 307, 308; 99/284, 290, 299, 304, 305, 307, 308
See application file for complete search history.

(56) References Cited

U.S. PATENT DOCUMENTS

| | | | |
|---|---|---|---|
| 4,071,042 A * | 1/1978 | Lombard et al. | 137/332 |
| 4,858,523 A * | 8/1989 | Helbling | 99/280 |
| 6,401,729 B1 * | 6/2002 | Ford | 134/22.1 |
| 6,968,859 B1 * | 11/2005 | Nagano et al. | 137/554 |
| 7,231,870 B2 * | 6/2007 | Lowe et al. | 99/299 |
| 7,353,751 B2 * | 4/2008 | Takizawa | 99/287 |
| 7,509,908 B1 * | 3/2009 | Lassota et al. | 99/305 |

* cited by examiner

*Primary Examiner* — Tu B Hoang
*Assistant Examiner* — Amit K Singh
(74) *Attorney, Agent, or Firm* — Potthast & Associates

(57) ABSTRACT

A dual-purpose brewer including a hot water dispenser system (25) for dispensing, hot water to a dispense outlet above a removable brew basket (18) with an electromagnetically controlled outlet drain valve (44) for selectively blocking beverage from leaving the brew basket (18) during a seeping period when making tea and leaves a drain hole (41) open throughout a brew cycle when making coffee. A drain plug (42) made of magnetic or ferromagnetic material is moved by an electromagnetic field to an open position (FIG. 6) to block a drain passageway (45) to drain the brew basket (18) of beverage and falls to a closed position (FIG. 5) during, a seeping period. Contact of electromagnetic coils (80, 82, 90) carried by the brew basket (18) with a source of energization is achieved through electrical contacts at the end of a. pivotally mounted actuation arm (34).

16 Claims, 6 Drawing Sheets

DUAL-PURPOSE BREWER AND BREW BASKET AND METHOD OF BREWING

CROSS-REFERENCE TO RELATED APPLICATIONS

This application is based on and claims the benefit under 35 U.S.C. 119(e) of U.S. provisional patent application 61/246,502, of the present inventor filed Sep. 28, 2009, for "A Combination Coffee and Tea Brewer and Method of Brewing", and U.S. provisional patent application 61/257,665, of the present inventor, filed Nov. 3, 2009, for "Brewer with Brew Basket Having Electromagnetic Drain Hole Actuator and Method of Brewing with Same" and provisional patent application 61/259,838, of the present inventor, filed Nov. 10, 2010 for "Brewer with Brew Basket Having Electromagnetic Drain Hole Valve and Method of Brewing", all of which are hereby incorporated by reference.

BACKGROUND OF THE INVENTION

1. Field of the Invention

This invention generally relates to electrical brewers with removable brew baskets and brew cycles that include a seeping period and to removable brew baskets.

2. Discussion of the Prior Art

Commercial beverage brewers of the type that have a source of hot water, a dispense system for selectively dispensing the hot water onto a beverage ingredient, i.e. ground coffee in the case of a coffee brewer, contained with a removable brew basket and a controller for controlling the dispense system and other aspects of brewing are well known. The hot water mixes with the beverage ingredient within the brew basket to form the beverage and then drains out of a drain hole at the bottom of the brew basket into removably mounted mating dispenser located beneath the dispenser. If desired, after completion of a brew cycle, the filled dispenser is removed and replaced by an identical empty dispenser and the brew basket with the spent beverage ingredient is replaced by one with a new filter paper and a new load of fresh, dry, beverage ingredient so that a new brew cycle may be immediately commenced.

In the case of commercial tea brewers, the preferred brew cycle includes a seeping period during which the hot water, perhaps the entire amount of the hot water for the batch size being made, is held within the brew basket. Such a seeping period can also be used with making coffee or other beverages, but coffee is generally made without a seeping period. In some tea brewers, the brew basket is not generally removable from the brewer and is integrated with an automatically controlled drain valve which is closed during the seeping period of the brew cycle. In other tea brewers, it is know to provide a siphon system to create a seeping period.

The removable brew basket used only for coffee or other beverages not requiring a seeping period has an open drain hole. Beverage percolating downwardly through the layer of beverage passes continuously from the open drain hole at the bottom of the brew basket while new hot water is being added to the top.

Because of the different requirements for making tea and making coffee and other like beverages, it is customary for coffee shops, restaurants, caterers and other commercial establishments to use two separate brewers for making tea and coffee. One is capable of seeping, fits with a brew basket with sufficient capacity to hold an entire batch of tea being made and is only used for tea. The other one does not require a seeping period, uses a relatively smaller brew basket with a capacity much less than the batch quantity being made during the brew cycle.

In addition to the additional expense of operating, cleaning and maintaining two separate machines, the two machines take up twice as much space as one machine and require an additional electrical and plumbing connection to a public water supply. In addition, even though there are two machines, as a group they still lack versatility and flexibility; if there is a higher demand for tea instead of coffee, the coffee dedicated brewer cannot be properly used to help meet the demand for tea.

SUMMARY OF THE INVENTION

It is therefore an object of the present invention to provide a single dual-purpose brewer and associated removable brew basket and method of brewing that may be employed to brew, in a single brewer, beverages with brew cycles both having and not having a seeping period.

This objective is achieved in part by providing a dual-purpose brewer assembly, having a brewing assembly including, within a housing, operator inputs, a hot water dispenser system for dispensing hot water from a source of hot water to a dispense outlet located above a brew basket mounting location, and a controller responsive to the operator inputs indicating which of two different brew cycles has been selected; a brew basket assembly having a brew basket body with means for removably mounting the brew basket to the housing at the brew basket mounting location in position to receive hot water from the dispense outlet and to dispense beverage to a beverage container at a beverage container location beneath the brew basket mounting location, an open top for receipt of hot water and a bottom, and an electromagnetically controlled outlet drain valve for selectively passing beverage out of the bottom of the brew basket to a beverage container; and means including the controller for selectively controlling the electromagnetically controlled drain valve assembly to operate differently depending upon which of the two different brew cycles has been selected.

Preferably, the two different brew cycles are respectively associated with a brew cycle for making tea in which the tea is seeped within the brew basket during a seeping period when the electromagnetically controlled outlet drain valve is closed, and another brew cycle for making coffee in which the electromagnetically controlled outlet drain valve remains open throughout the other brew cycle. The electromagnetically controlled outlet drain valve includes a drain passageway, a drain plug made of magnetic or ferromagnetic material movable in response to a changing magnetic field to move the plug between a closed position in which the plug blocks the drain passageway to prevent beverage from draining out of the brew basket, and an open position in which the plug does not block the drain passageway and beverage within the brew basket is allowed to drain out of the brew basket.

In one embodiment the electromagnetically controlled outlet drain valve includes a split-core magnetic coil assembly including a half of the magnetic coil attached to the housing of the brewer assembly and electrically connected to and energizable by the controller, and another half of the magnetic coil carried by the brew basket adjacent the outlet drain valve. The magnetic coil half attached to the housing is attached to the housing at the end of an arm that is movably mounted to the housing to move relative thereto between an operable position in which it may be operably connected with the other magnetic coil half when the brew basket assembly is fully removably mounted to the housing at the brew basket mounting location. Each of the one and the other of magnetic half coils has mating connectors for electrically connecting the half coils together form a single operable electromagnetic coil.

In another embodiment, the electromagnetically controlled drain valve assembly includes an electromagnetic coil carried by the brew basket on one side of the drain passageway, and an actuation arm movably mounted between an inoperable position spaced from the brew basket body and an operable position in which electrical contact is made with the electromagnetic coil to enable energization of the electromagnetic coil. Another electromagnetic coil is carried by the actuation arm and located on a side of the drain passageway that is opposite the one side. A second electromagnetic coil is carried by the brew basket on the one side of the drain passageway and next to the one electromagnetic coil. Multiple coils on both sides may be employed for greater field strength.

Also, achievement of the invention is obtained in part by provision of a dual-purpose brew basket assembly, with a brew basket body with an open top, and a bottom with a drain passageway; an electromagnetically controllable drain plug movable within the drain passageway between an open position in which beverage in the brew basket body may flow out of the drain passageway, and a closed position in which the drain passageway is blocked by the drain plug to prevent flow of beverage from the brew basket body through the drain passageway.

In one embodiment the brew basket body has an inner wall and an outer wall adjacent the bottom of the brew basket body, and the drain passageway extends between the inner wall and the outer wall. The drain plug is made at least in part from a magnetic or ferromagnetic material. The basket assembly includes a downwardly extending semicircular, semi-annular collar partly surrounding and partly defining the drain passageway and extending downwardly from the bottom of the brew basket with an electromagnetically energizable element. Preferably, the electromagnetically energizable element is half of an electromagnetic coil, and the collar includes a body that protectively surrounds the coil and carries electrical contacts for mating connection with mating contacts of an associated other half of the electromagnetic coil carried by the brewer to which the brew basket body may be removably mounted. The drain plug is movable to an open position in response to generation of a local electromagnetic field, and movable to a closed position by the force of gravity when the local electromagnetic field is not being generated.

The objective is additionally acquired by providing a method of using a brewer assembly for a dual purpose of brewing beverages that require a seeping period and those that do not require a seeping period, by performance of the steps of mounting a dual-purpose brew basket assembly to the brewer assembly having a brew basket body with an open top and a bottom with an electromagnetically controlled outlet drain valve for selectively passing beverage out of the bottom of the brewer basket to a beverage container; responding to an operator input indicating selection of a brew cycle for a beverage that requires a period of seeping during which the beverage is not permitted to drain out of the brew basket to electromagnetically cause the valve to close during the seeping period; and responding to an operator input indicating selection of a brew cycle for a beverage that does not require a period of seeping a brew cycle to electromagnetically cause the valve to remain open throughout the brew cycle.

Preferably, the method includes the steps of moving an energizable electromagnetic element movably mounted to the brewer assembly to an operable position, and selectively energizing the electromagnetic element to close the electromagnetically controlled outlet drain valve during the period of seeping. The electromagnetic element is automatically moved to the operable position in response to an operator input indicating selection of a brew cycle for a beverage requiring a period of seeping. The electromagnetic element is automatically moved to an inoperable position in response to an operator input indicating selection of a brew cycle for a beverage that does not require a period of seeping.

Acquisition of the objective is also partly achieved by providing a method selectively brewing beverages with and without a seeping period, by performing the steps of removably attaching a first type of brew basket to a brewer to brew a beverage with a brew cycle that includes a seeping period, said first type of removably mounted brew basket having an electromagnetically actuatable drain valve; operating the brewer with a first brew cycle that includes a seeping period to make beverage; removably attaching a second type of brew basket to the brewer in place of the first type of brew basket to brew a beverage with a brew cycle that does not have a seeping period, said second type of brew basket having an open, non-closable drain hole and a capacity that is less than that of the first type of brew basket; operating the brewer with a second brew cycle that does not include a seeping period. Preferably, the method includes the step of moving an actuator arm to an operative position in which electrical contact is made with the electromagnetically actuatable drain valve when the brewer has been selected to perform the first brew cycle that includes a seeping period, said electrical contact enabling selective actuation of the drain hole between open and closed positions.

BRIEF DESCRIPTION OF THE DRAWINGS

The forgoing objects, features and advantages of the present invention will be made apparent from the following detailed description of the preferred embodiments which is given with reference to the several figures of the drawings, in which.

DETAILED DESCRIPTION

Figure 1:
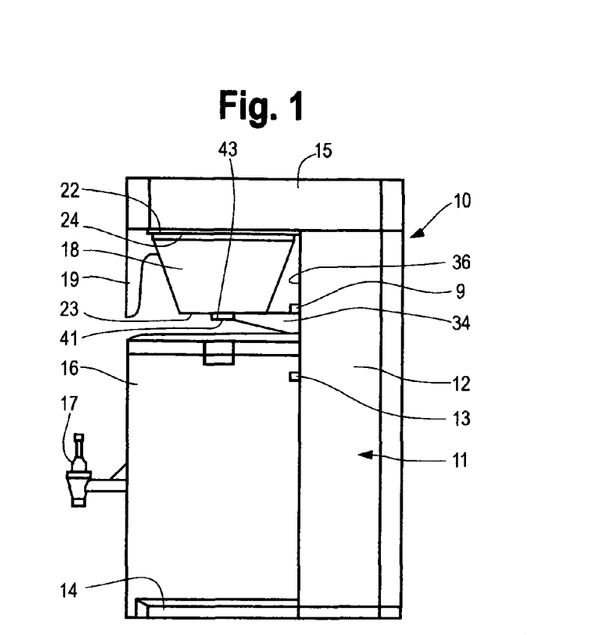
FIG. 1 is a schematic side-view illustration of the dual-purpose brewer, or combination coffee and tea brewer, of the present invention configured with an optional tea brew basket to facilitate the brewing of fresh tea or other beverages with a seeping period during the brew cycle.

Referring to FIG. 1, the dual-purpose brewer assembly, or combination coffee and tea brewer, or brewer, 10 of the present invention, is seen to include a brewer housing 11 including a vertically extending aft section 12 which is supported by a pair of forwardly extending, elongate, parallel legs 14 (only one shown) on opposite sides of the brewer 10. Support leg 14 on the right side of the brewer 10 is seen in the drawing. The aft housing section 12, in turn, supports, at its top, an upper housing section 15. The upper housing section 15 extends forwardly of the aft housing section 12 in cantilever fashion. Fitted in the space between the support legs 14 is an insulated, portable mating dispenser 16 especially fitted to the brewer 10 to receive either hot tea, hot coffee or other beverage directly from either one of two types of brew baskets, such as removable dual-purpose brew basket, or tea brew basket, 18 Shown in Figs, 1 and 3-6, or a regular conventional brew basket, or coffee brew basket, 20, shown in FIG. 7. The dual-purpose brew basket 18 is used with the dual-purpose brewer 10 when brewing a beverage that requires a seeping period, such as tea. Preferably, the conventional brew basket, or coffee brew basket, 20 is used when brewing beverage that does not require a seeping period, such as coffee.

Figure 3:
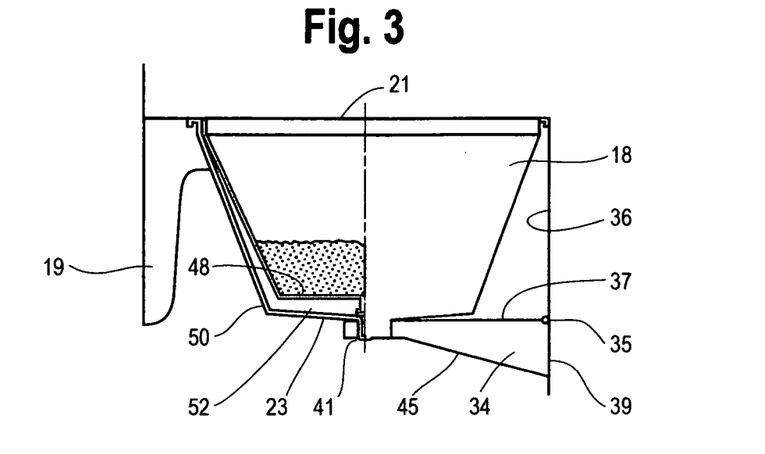
FIG. 3 is a side view, partly in cross-section, of a preferred embodiment of the so-called tea brew basket that is employed with the dual-purpose brewer of FIG. 1.
Figure 4:
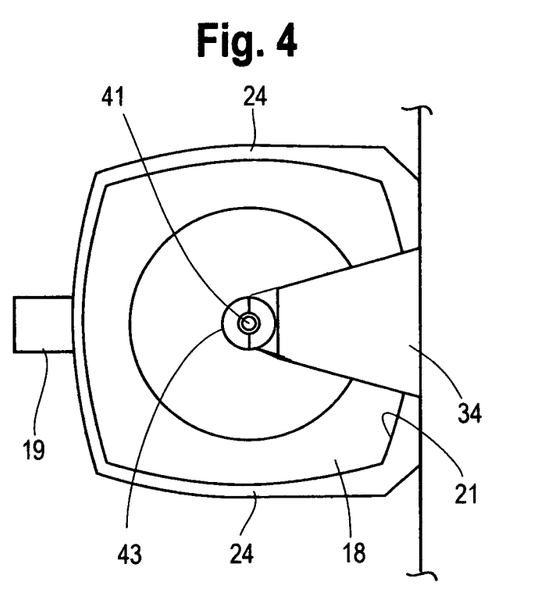
FIG. 4 is a bottom view of the tea brew basket of FIG. 1 as viewed from the top of the dispenser.

The brew basket 18 has a handle 19 at the front for installing and removing the brew basket 18, an open top 21, FIGS. 3 and 4, and a drain hole 41 at the end of a semi-circular collar 43 extending downwardly from the bottom 23 of the brew basket 18.

The dispenser 16 has a funnel inlet opening at its top located directly beneath the drain hole 41 for direct receipt of beverage from the brew basket 18 or the brew basket 20. The dispenser 16 is insulated and is removably mounted at a dispenser fill location, as shown in FIG. 1, between the support legs 14 for receipt of the beverage. After the dispenser 16 is removed, it may be replaced by another identical dispenser for receipt of beverage during a new brew cycle, while the recently filled dispenser 16 is moved to remote serving location where the beverage is dispensed from a manually controlled faucet 17.

A dispenser sensor 13 at the forwardly facing wall 36 of the aft housing section 12 detects when a dispenser 16 is at the proper load location for receipt of beverage, and a brew basket sensor 9 detects When the dispenser 18 is in the fully installed location, as shown in FIG. 1, for receipt of hot water. The brew basket sensor 9 may also function as the arm position sensor 110, FIG. 2, to sense when the arm is in the lowered or raised position. The sensors 9 and 13, although shown projecting for purposes of illustrations, are, in fact, flush with the wall 36.

Figure 7:
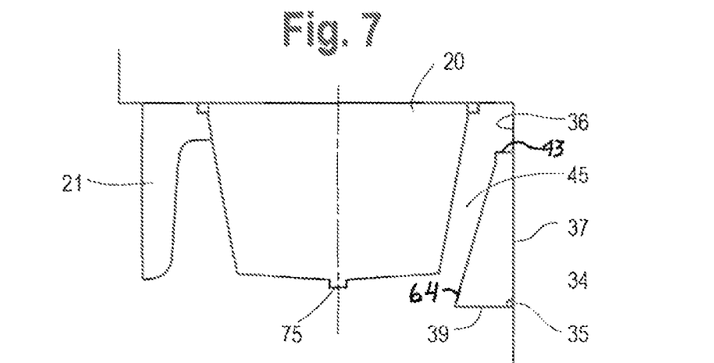
FIG. 7 is a side view of a coffee brew basket with an open uncontrollable drain hole that is alternatively used with the combination brewer of FIG. 1 in lieu of the tea brew basket when the combination brewer is configured to brew coffee instead of tea.

The upper housing section 15, on its underside, supports whichever one of the brew baskets 18 and 2 is mounted. Affixed to the underside of the upper housing section 16 is a pair of elongate, parallel, spaced-part, L-shaped brew basket mounting rails 22 which are adapted for sliding releasable receipt of outwardly extending mounting shoulders, such as shoulders 24 carried at the top of the tea brew basket 18. One of the two brew baskets, either tea brew basket 18 of FIG. 1, or coffee brew basket 20 of FIG. 7, are suspended from the underside of the forwardly extending part of the upper housing section 15, in a fully inserted position, as shown in FIG. 1, during and before the start of a brewing cycle. When the brewing cycle is completed, the brew basket 18 or 20 is slidably removed from the brew 10 to either be cleaned and refilled with fresh coffee or tea ingredient 7, FIG. 3, and then remounted or to be promptly replaced with another brew basket of either type that has already been loaded with a filter paper, if one is used, and a load of dry beverage ingredient.

It should be appreciated that while the terms "tea brew basket" and "coffee brew basket" are used her to distinguish the two brew baskets 18 and 20, either of the brew baskets 18 or 20 could be used to brew the ingredient of the other. In particular, the tea brew basket 18 can be readily be used to brew either coffee or tea, i.e. to brew beverage with a seeping period or without. The coffee brew basket could, in fact, be used to brew tea but the brew cycle would not include a seeping period.

However for practical reasons, an operator may elect to use the tea brew basket 18 only for brewing tea or other beverage with a seeping period and use the coffee brew basket 20 whenever seeping is not required. The coffee brew basket 20 need not be as large as the tea brewer 18, has less of a need for insulation because of no seeping capability, is less complicated and may be made more cheaply than the tea brew basket 18. In addition, if more coffee brewing is required than tea brewing, than extra coffee brew basket will be cheaper to make and buy. Accordingly, an important aspect of the invention is the ability to use these different types of brew baskets to respectively make tea and coffee, but not necessarily both with the same brew basket, despite the capability of doing so.

Figure 2:
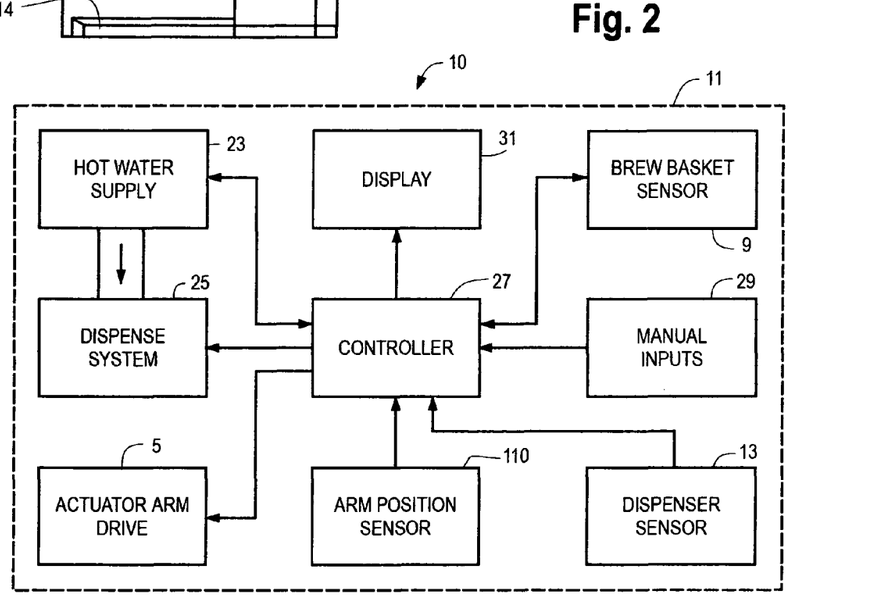
FIG. 2 is a functional block diagram of the dual-purpose brewer of FIG. 1.

Referring to FIG. 2, the brewer 10 is a drip type coffee brewer, and as such contains, the usual components: a hot water supply 23 such as a hot water tank or hot water generator, within the aft housing section 12, a hot water dispensing system 25 within the upper housing 15 for passing hot water from the hot water supply 23 to the open top of the brew basket 18 or 20, a controller 27 mounted within the upper housing section 16, and an operator control interface with manual inputs 29, such as inputs for beverage selection, start brew, emergency stop, brew cycle selection, program inputs, etc. and a display 31, carried at the outside front of the upper housing section 15. Sensor inputs 33 include temperature and levels sensors for the hot water supply 23. These parts of conventional commercial drip-type coffee brewers are well known in the art of coffee making equipment, and reference should be made to a number patents on such drip-type brewers, such as such as U.S. Pat. No. 5,000,082, filed Jul. 27, 1988; U.S. Pat. No. 5,331,885, filed Apr. 6, 1993; U.S. Pat. No. 6,148,717, filed Aug. 11, 1998; and U.S. Pat. No. 6,705,208, filed: Apr. 18, 2002, all of which are hereby incorporated by reference, if further details are required.

The novelty of the present invention resides, at least in part, on the provision of special features of the tea brew basket 18, and cooperating corresponding special features of the brewer 10, itself, apart from the brew baskets, that enables the use of the special features of the tea brew basket 18. The novel feature of the tea brew basket 18 is the provision of an electromagnetically controlled drain valve 44 which includes the drain hole 41 surrounded by a special collar 43.

The special feature of the brewer 10, itself, is the provision of a movably mounted actuation arm 34 with associated actuator driver 35 which carries means for selectively actuating the electromagnetically controlled drain valve assembly 44, under direction from the controller 27. Depending upon the brew cycle selected via the manual inputs 29, the electromagnetically controlled drain valve is operated with or without a seeping period during which the electromagnetically controlled drain valve 44 is closed. The actuation arm 34 is preferably mounted to a central portion of the forwardly facing fronts wall 36 of the aft housing 12 by means of horizontal hinge joints 35, FIG. 3. These horizontal hinge joints 35 enable the actuation arm 34 to swing, or pivot, between two different positions, under control of the controller 27: an operative position in which the actuation arm 34 is folded downwardly and extends forwardly from the front of the aft housing 12 to engage the drain valve 44, as shown in FIG. 1, and an upwardly collapsed, inoperative position, in which the actuation arm is pressed against the front wall 36, as shown in FIG. 7.

Figure 5:
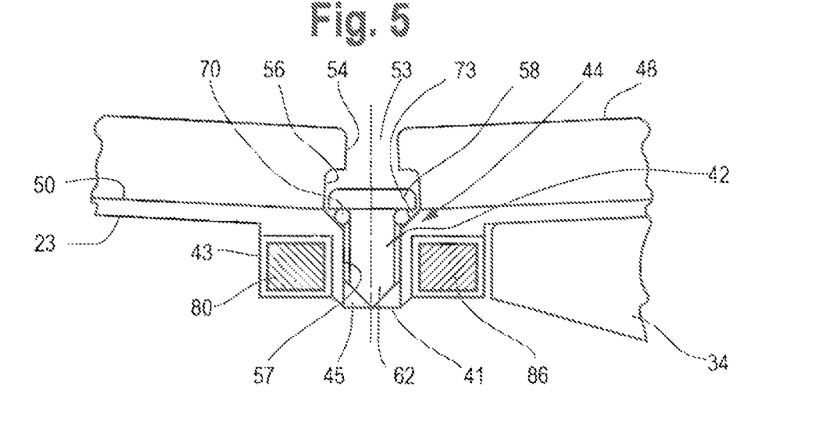
FIG. 5 is an enlarged portion of the tea basket of FIGS. 3 and 4 illustrating the position of the valve plug, or valve plug, when in the closed position.
Figure 6:
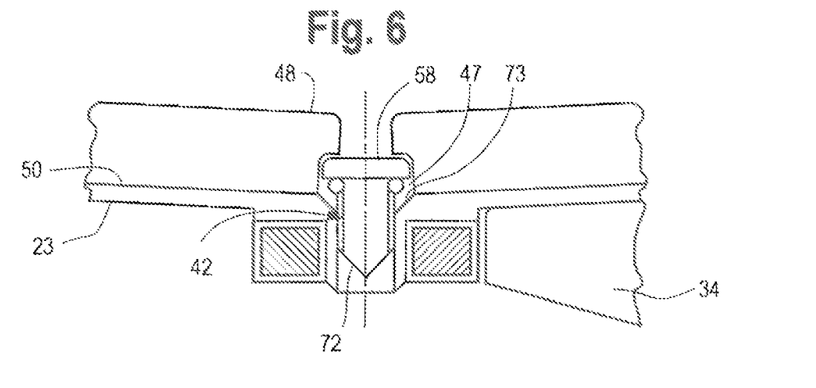
FIG. 6 is an enlarged portion of the tea basket of FIGS. 3 and 4 that is similar to that of FIG. 6 except the valve plug is shown in the open position.
Figure 13:
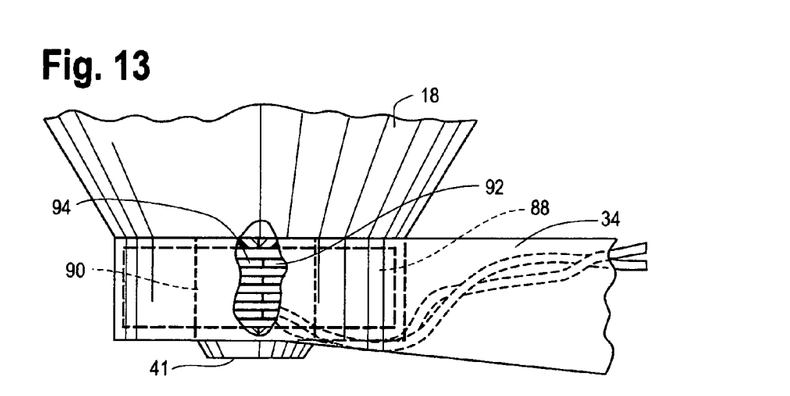
FIG. 13 is aside view, partly in section, showing the electrical connections of the two half coils of FIGS. 11-12.

Referring also to FIGS. 5 and 6, the actuation arm 34 carries at its end means for engaging and making electrical contact with an electromagnetic coil carried in the collar 34 of the brew basket 18 to enable the electromagnetic coil to selectively generate an electromagnetic field in the proximity of the drain valve assembly 44. In the preferred embodiment, illustrated in FIGS. 8-10, when mated together with the dual-purpose brew basket 18 being fully mounted to the upper housing 15, a pair of electromagnetic coils 80 and 82 protectively carried by the valve assembly 44 within the collar 34 on one side of a drain passageway 45 are connected through a suitable switch controlled by the controller 27 to a source of electrical power contained within the upper housing 15. Preferably, another pair of electromagnetic coils 84 and 86 are carried at the end of the actuation aim 34 on the opposite side of the drain passageway 45 to create a balanced electromagnetic field surrounding the drain passageway and drain hole 41. In the embodiment of FIGS. 11,12 and 13, half of a split electromagnetic coil 90 is carried by the drain valve assembly 44 which connects with a mating half coil 88 carried at the end of the actuation arm 34 to create a balanced field directed upwardly around and through the electromagnetically controllable drain valve assembly 44 and drain passageway.

Still referring to FIGS. 5 and 6, the drain passageway 45 is selectively blocked to prevent passage of beverage by a drain plug 42 in response to the electromagnetic field generated by the coils 80-86 or by the coiled formed by half coils 88 and 90. All, or only a part, such as the head, of the drain plug 42 is a fixed magnet or a ferromagnetic material, preferably encased in plastic approved for use with hot beverages. The relative magnetic field directions of the plug and the electromagnetic coils are selected such that when the electromagnetic field is generated, the drain plug 42 is magnetically repelled up and away from the source of the magnetic field to an open position, as shown in FIG. 6, to allow the beverage to drain out of the brew basket 18. When a seeping period is desired, the energization is ended to collapse the electromagnetic field and gravity then causes the plug 42 to fall down to a closed position, as shown in FIG. 5, in which drainage of beverage through the drain passageway 45 is blocked. Alternatively, a spring is used to assist gravity to move the plug 42 to the closed position.

Referring now also to FIG. 3, as well as to FIG. 5 and FIG. 6, the tea brew basket 18 has a double-wall construction with an inner wall 48 surrounded by an outer wall 50 with a space 52 therebetween that is either partially evacuated to provide insulation, is filled with insulation material or is simply filled with air to provide air gap insulation. This insulation reduces heat loss while the brew basket being is required to hold large batch quantities of hot tea through a seeping period of the brew cycle. In addition to providing insulation the double-walled construction provides space between the two walls 48 and 50 to protectively contain the drain passageway 45. The drain passageway is formed by a wall interconnecting inner wall 48 with outer wall 50 and is insulated thereby.

The drain passageway 45 includes a relatively narrow inlet passageway 54 with an inlet opening 53 formed in the inner wall 48 located above an enlarged plug head section 56 above the drain hole 41. The plug head section 56 is large enough to accommodate and guide vertical sliding movement of a plug head 58 of the plug 42. However, the plug head 58 is wider than the relatively narrow inlet passageway 54 and is also wider than a relatively narrow outlet passageway 57 in the collar 43. The inlet passageway 57 begins at the bottom of the plug head section 56 and ends at the drain hole 41. Thus, the plug head 58 is trapped within the plug head section 56 between the inlet 53 and the drain hole 41. The double wall advantageously facilitates this construction.

The plug head 58 is attached to a plug shaft 62 that does extend downwardly and is slidably and loosely received within the outlet passageway 57. An O-ring seal 70 is carried at the underside of the plug head 58. When the drain hole valve assembly 44 is closed, the O-ring seal 70 is pressed against a truncated, conical, valve seat 73 extending between the plug head section 56 and the outlet passageway 57 to provide a relatively water tight seal, as best seen in FIG. 6. When the drain hole assembly 44 is open, brewed beverage is allowed to pass around the plug head 58 and O-ring seal 70 and downwardly between the plug shaft 62 and the inwardly facing sides of the outlet passageway 57 along a plurality of elongate, downwardly extending, vertical, grooves 42 formed in the sides of the plug shaft 62.

Figures 8, 9:
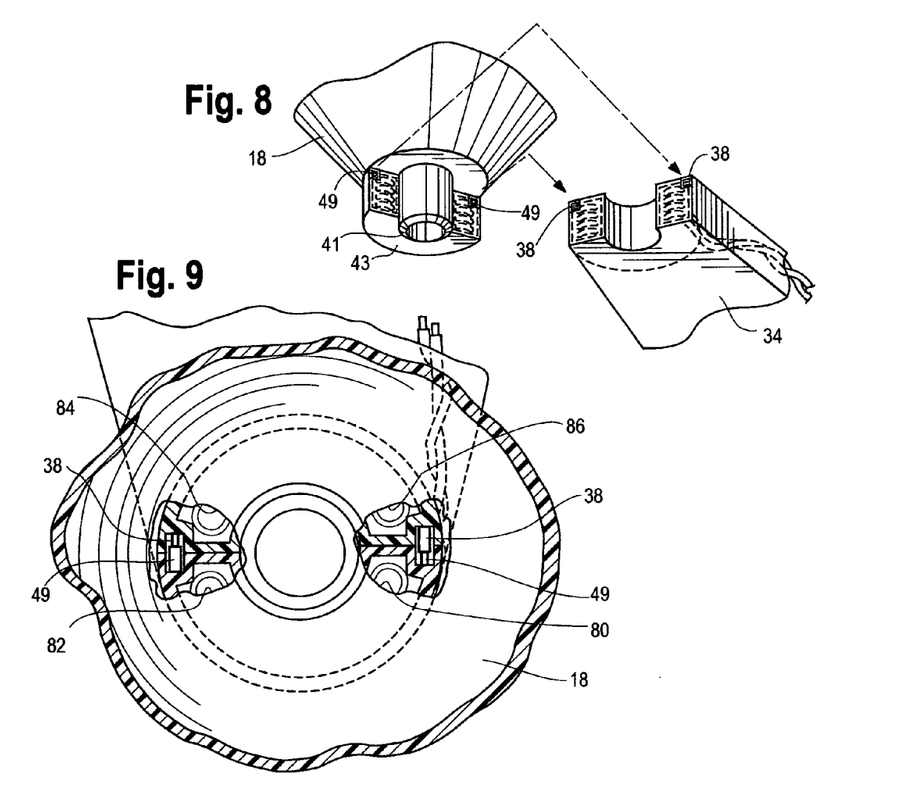
FIG. 8 is a perspective exploded view of the actuation arm and valve assembly of one form of the invention in which both the actuation arm and the brew basket drain valve assembly has a pair of complete electromagnetic coils that are enabled to be electrically interconnected with a source of energization when the actuation arm engages the drain valve assembly in mating relationship.
FIG. 9 is a plan view, partly in section, showing the coils of FIG. 8 when the arm engages the drain valve assembly in mating engagement.
Figure 10:
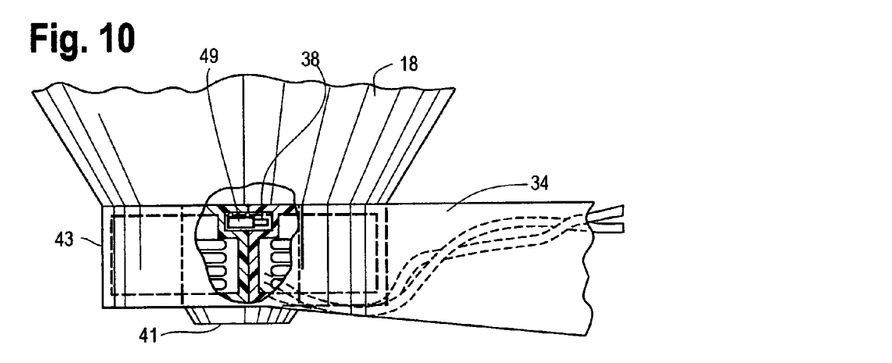
FIG. 10 is a side view corresponding to the view of FIG. partly in section.
Figures 11, 12:
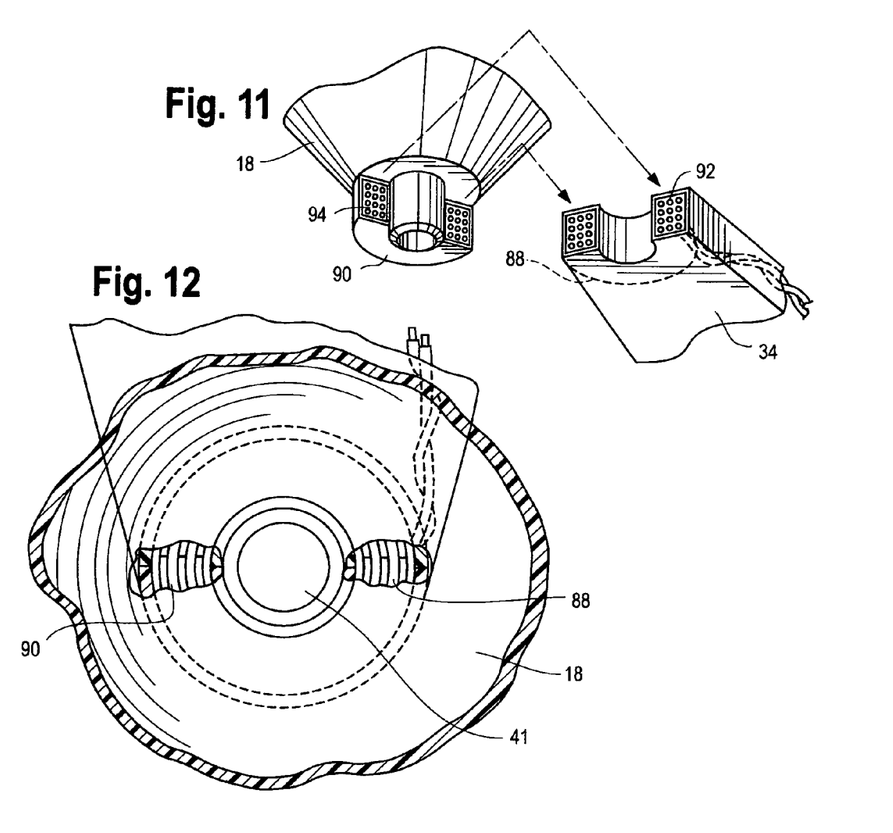
FIG. 11 is an exploded perspective view similar to that of FIG. 8 showing the end of the actuation arm and the drain valve assembly of another form of the invention in which two half coils are mated together to create a single energizable electromagnetic coil centered around the drain hole.
FIG. 12 is a side view, partly in section, showing the two half coils and their mating electrical and spatial interconnection.

Referring to FIGS. 8, 9 and 10, one embodiment of the valve assembly 44 is seen to include a pair of electromagnetic coils 80 and 82 connected in series circuit and carried in the collar 43 and another pair of coils 84 and 86 connected in series circuit and carried at the end of the actuation arm. When the actuation arm 34 is mated with the collar 43, then a pair of electrical connectors 38 at opposite sides of the arm coils 84 and 86 make electrical contact with a pair of corresponding electrical connectors 49 at the opposite sides of the series circuit formed by the brew basket electromagnetic coils 80 and 82. The electrical contact connects the brew basket coils 80 and 82 to an electrical source carried in the upper housing 15 so that they may be selectively energized. The arm coils 84 and 86 are connected in parallel with the brew basket coils 80 and 82 when joined, so that all four coils are energized at the same time. This creates a uniform electromagnetic field to move the drain plug 62. However, preferable each of the pairs of electromagnets creates a sufficient field to elevate the drain plug to the open position. Such redundancy enables either one of the pair of brew baskets coils to continue to operate the drain valve assembly 44 even if the other pair should short-out or otherwise cease to properly function.

In another embodiment shown in FIGS. 11, 12 and 13, the electromagnetic field force is provide by a single electromagnetic coil, or composite coil, that has been split into two mating half-coils 88 and 90 respectively carried by the actuation arm 34 and the brew basket 18. Half-coil 88 has a plurality of connectors 92 that mate with a plurality of connectors 94 of the half coil 90. Once mated, a single electromagnetic coil is created which has a symmetrical axis aligned with the central axis of the drain plug and the drain hole 41 to create a symmetrical electromagnetic field also so-aligned.

When it is desired to make tea, which requires steeping, then the tea option is selected through the operator interface. When this selection is made the arm 34 is automatically lowered by electromechanical means if sensors detect that there are no obstructions or and indicator is actuated to direct the operator to manually lower the arm. After the arm has been lowered to the operative position, a sensor informs the controller and, if a brew basket is sensed in the operative position, the brewer 10 is enabled to commence a brew cycle once a start command is received. Depending on other selections and circumstances, such as the type of tea or the quantity, the valve assembly 44 will be caused to close for a longer or lesser period of time.

Referring to FIG. 7, if a brew cycle for coffee, or other beverage that does not require a period of seeping, is selected then the actuation arm 34 is automatically lifted to the inoperative position, as shown in FIG. 7, and the tea brew basket 18 is replaced with the coffee brew basket 20. In the case of a coffee brew cycle, there is usually no control of the rate of draining from the drain hole 75 of the brew basket 20 and coffee beverage flows at a rate dependent only on the size of the fixed drain hole 75 and quantity of beverage within the brew basket 20.

The actuation arm 34 is preferably pivotally mounted to a central portion of a forwardly facing front wall 36 of the aft housing 12. The actuation arm 34 is movably attached to the aft housing 12 by means of horizontal hinge joints 35, as best seen in FIGS. 2 and 6. These horizontal hinge joints enable the actuation arm 34 to swing, or pivot, between two different positions: an operative position in which the arm 34 extends forwardly from the front of the aft housing 12, as shown in FIG. 1, and an upwardly collapsed, inoperative position in which the arm is pressed against the front wall 36, as shown in FIG. 6. When the arm is in the elevated position, it may be held in such position by means of the actuator arm driver 5, FIG. 2, which may be any electromechanical mechanism such as a bidirectional servo or other type of motor, a rotary solenoid, etc. Alternatively, there may be releasable mating mechanical fasteners releasably attaching the actuation arm 34 to the front wall 36. The actuator arm 34 may also be manually moved and latched in position and returned manually or by means of a retraction spring.

Referring to FIG. 7, the actuation arm 34 has a generally trapezoidal shape. An elongate section 37 that extends horizontally when in an operative position, as shown in FIG. 2, extends vertically and is pressed snugly against the front wall 36, when in the inoperative position, as shown in FIG. 6. Another shorter section 39, that is perpendicular to the section 37, abuts against the vertical front wall 36 when in a lowered operative position to hold the actuation arm 34 securely with the section 37 in a horizontal orientation. Opposite the shorter section 39 is a distal section 43 that engages the tea brew basket 18 during operation, and fourth elongate section 64 extends between the sections 39 and 43. The elongate section 64 slants inwardly and upwardly from the section 39 when the actuation arm 34 is in the inoperative, elevated position to provide good clearance space 45 between the front wall 36 and the back side 47 of the coffee brew basket 20.

Figure 14:
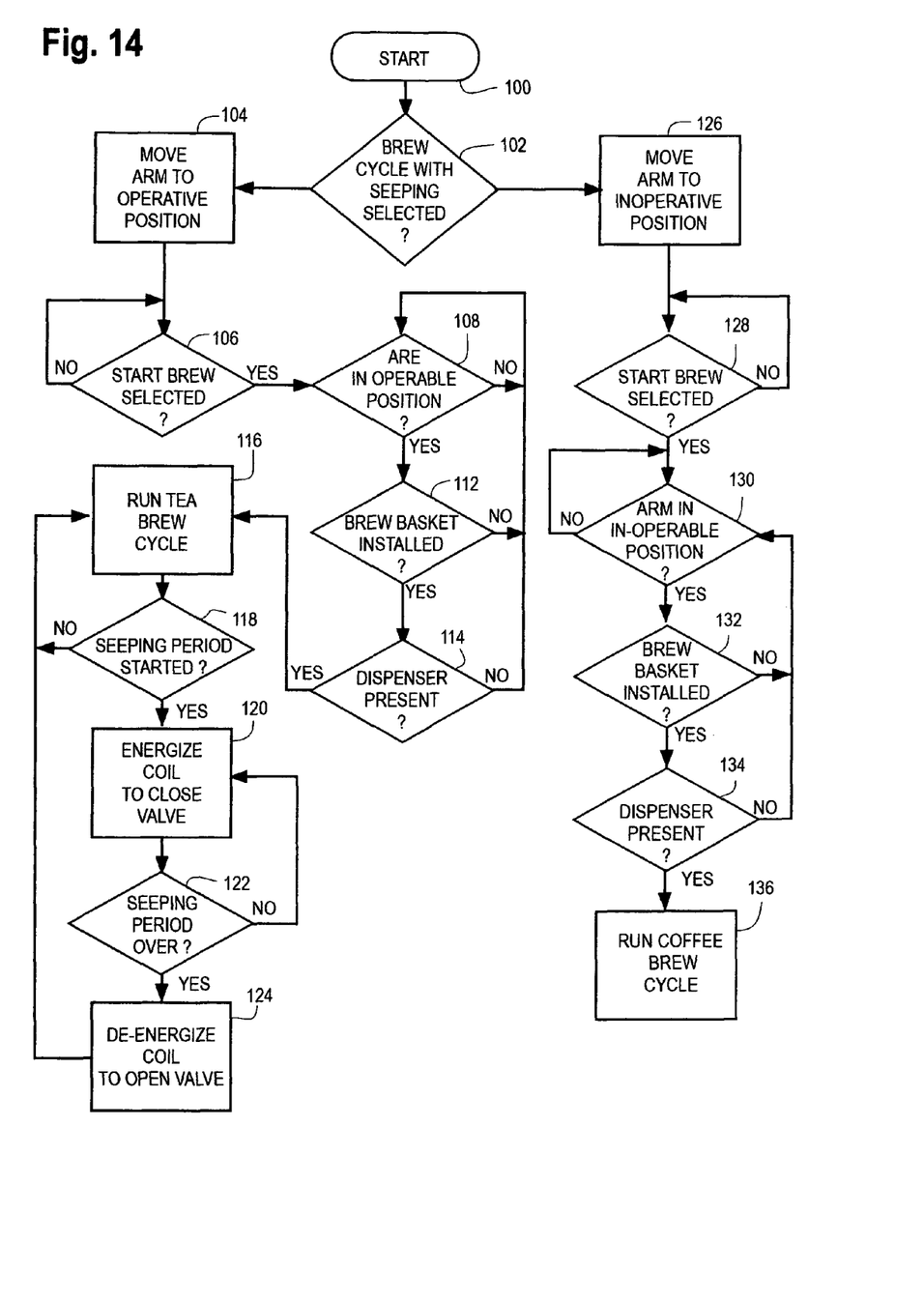
FIG. 14 is a logic flow chart of operation of the dual-purpose brewer in accordance with software associated with and operator inputs to the controller.

The controller 27 is a microprocessor based control circuit that is programmed to generally operate in accordance with the logic flow chart of FIG. 14. It should be understood that, in addition to a microprocessor, the controller has interface circuitry to actuate what needs to be actuated and to receive inputs from manual switches and automatic sensors. The controller 27, in addition to performing the functions that are unique to this invention also performs routine functions such as monitoring and controlling the temperature and quantity of hot water, responding to routine manual inputs, etc.

However, in accordance with the present invention the controller 27 uniquely contains in storage different brew cycles for different type of beverage including both tea and coffee. Brew cycles include the duration of a dispense period and a drip period. The brew cycle may also specify if the dispensing is performed continuously or intermittently, the percentage of bypass water, the quantity and temperature of hot water to be dispensed, etc. in addition to specifying the duration of the seeping period. The stored brew cycles include one or more brew cycles for brewing tea that require a seeping period during which all or most of the hot water that is dispensed into the brew basket is maintained within the brew basket and not allowed to drain for a preselected time seeping time period.

Seeping requires a brew basket with sufficient capacity to hold all the tea that is made in a batch during a single brew cycle. The stored brew cycles also include one or more brew cycles for brewing coffee or other beverage that does not require a seeping period and the beverage therefore continuously drains from the brew basket once the hot water has percolated down through the layer of ingredient in the brew basket. Such a brew cycle does not require a brew basket capable of holding the entire batch quantity and therefore when brewing coffee or the like, a smaller brew basket, without a double-walled construction, such as shown in FIG. 7 may be used. Preferably, the controller 27 also controls the temperature of the hot water to lower the temperature for tea relative to coffee, and vice versa., such as with an on-demand heating chamber.

Referring to FIG. 14, after start 100 of the operating program, a determination is made in step 102 whether a brew cycle with a seeping period has been selected or not it should be appreciated that the stored brew cycle includes information other than seeping period such as quantity, temperature, whether dispensing should be pulsed or continuous, rate of dispensing, drip period, etc. Such selection is via the manual inputs 29 and may include actuation of a start brew switch that is uniquely associate with one type of brew cycle or actuation of a brew cycle type selection switch or other input.

If a brew cycle with a steeping period has been selected then the program moves to step 104 at which the controller 27 causes the arm 34 to lower to the operative position shown in FIG. 1 if it is not already in that position. The actuation arm drive 103, FIG. 2 may be a servo-motor or rotary solenoid which may be used in conjunction with bias spring or any other equivalent electromechanically controlled device to affect the desired motion of the actuator arm 34. If the movement of the arm is not done automatically, then in step 104 an operator indicator is activated instead to advise the operator to manually lower the arm 34 to the operative position. In either case, the brew cycle will not commence until the arm is in operative position. The arm 34 will not be automatically moved to the operative position if the brew basket is sensed to be in position and thereby blocking the movement. Next, in step 106 a determination is made whether a start brew command has been selected, such as actuation of a manual start brew switch, if such command is not already incorporated into the brew cycle selection.

In step 108, it is determined whether the actuation arm 34 is in the operative position, as indicated by the arm position sensor 110, FIG. 2. In step 112, it is determined whether the brew basket 18 is installed (and not the smaller coffee brew basket 20 with no drain control) and the drain valve 44 operatively electrically connected for control by the controller 27. The brew basket sensor may also be positioned to sense the larger size of the tea brew basket 18.

If it is determined that the dispenser 16 is present in correct position beneath the brew basket 18, then in step 116 the stored and selected brew cycle with steeping begins to run. In step 118, when the steeping period begins, which may commence with the start of the brew cycle, if the valve 44 is not already close, the electromagnetic coils of the valve 44 are de-energized in step 120 to close the valve 44 and block draining from the brew basket 18. Once the drain valve 44 is closed dispensing the batch amount of hot water at the correct temperature from the hot water supply 23 into the top of the brew basket begins and continues until all the preselected amount of water has been added to the ingredient to seep with the tea leaves, tea bags, powered tea or the like for a preselected seeping time period. When the seeping period is ended, in step 122 the program moves to step 124 to energize the coils to move the plug upward and close the valve 44. This enables the beverage to drain through the drain passageway 45 directly into the dispenser 16 from which it is later dispensed in individual servings. The program then returns to start 100.

This sequence of steps is repeated for all brew cycles that require a steeping period. The seeping periods may be of different durations for different brew cycles. In step 102, if it is determined that a brew cycle without a steeping period has been selected; then the program moves to step 126. In step 126, the actuation arm is moved back to the inoperative position against the front wall 36 of the aft housing 12, and in step 128 the program waits for a start brew signal. Then in steps 130, 132 and 134 determinations are made as to whether the actuation arm 34 is out of the way and positioned in the inoperative position, whether the brew basket 20 is in place and whether the dispenser 16 is in the proper location to receive the freshly brewed beverage. If the answers to all these questions are affirmative, then in step 136, the stored and selected coffee brew cycle is run.

If an option is selected to run the program without use of the coffee brew basket 20 and using only the tea brew basket 18, even when brewing coffee, then step 136 includes a command to de-energize the coils and keep the drain valve 44 open throughout the coffee brew cycle.

While a particular embodiment has been disclosed, it should be appreciated that changes may be made without departing from the scope of the invention. For instance, while the arm is mounted to swing downwardly to an operative position, it could also be mounted swing upwardly or laterally to the operative position. The arm could also be mounted to swing horizontally or to extend telescopically. In the case of using the tea brew basket 18 even when making beverages without a seeping period, the actuation arm 34 may be held in a fixed position.

The invention claimed is:

1. A dual-purpose brewer assembly, comprising:
   a brewing assembly including, within a housing, operator inputs, a hot water dispenser system for dispensing hot water from a source of hot water to a dispense outlet located above a brew basket mounting location, and a controller responsive to the operator inputs indicating which of two different brew cycles has been selected;
   a brew basket assembly having a brew basket body with means for removably mounting the brew basket to the housing at the brew basket mounting location in position to receive hot water from the dispense outlet and to dispense beverage to a beverage container at a beverage container location beneath the brew basket mounting location,
   an open top for receipt of hot water and a bottom, and
   an electromagnetically controlled outlet drain valve for selectively passing beverage out of the bottom of the brew basket to a beverage container including a split-core magnetic coil assembly having
   a half of the magnetic coil attached to the housing of the brewer assembly and electrically connected to and energizable by the controller;
   an other half of the magnetic coil carried by the brew basket adjacent the outlet drain valve; and
   means including the controller for selectively controlling the electromagnetically controlled drain valve assembly to operate differently depending upon which of the two different brew cycles has been selected.

2. The dual-purpose brewer assembly of claim 1 in which the magnetic coil half attached to the housing is attached to the housing at the end of an arm that is movably mounted to the housing to move relative thereto between an operable position in which it is enabled to be operably connected with the other half of the magnetic coil when the brew basket assembly is fully removably mounted to the housing at the brew basket mounting location.

3. The dual-purpose brewer assembly of claim 1 in which each of the one and the other of magnetic half coils have mating connectors for electrically connecting the half coils together form a single operable electromagnetic coil.

4. A dual-purpose brewer assembly, comprising:
   a brewing assembly including, within a housing, operator inputs, a hot water dispenser system for dispensing hot water from a source of hot water to a dispense outlet located above a brew basket mounting location, and a controller responsive to the operator inputs indicating which of two different brew cycles has been selected;
   a brew basket assembly having a brew basket body with means for removably mounting the brew basket to the housing at the brew basket mounting location in position to receive hot water from the dispense outlet and to dispense beverage to a beverage container at a beverage container location beneath the brew basket mounting location,
   an open top for receipt of hot water and a bottom, and
   an electromagnetically controlled outlet drain valve for selectively passing beverage out of the bottom of the brew basket through a drain passageway to a beverage container; and
   means including the controller for selectively controlling the electromagnetically controlled drain valve assembly to operate differently depending upon which of the two different brew cycles has been selected, said electromagnetically controlled drain valve assembly including
   an electromagnetic coil carried by the brew basket on one side of the drain passageway, and
   an actuation arm movably mounted between an inoperable position spaced from the brew basket body and an operable position in which electrical contact is made with the electromagnetic coil to enable energization of the electromagnetic coil.

5. The dual-purpose brewer assembly of claim 4 including another electromagnetic coil carried by the actuation arm and located on a side of the drain passageway that is opposite the one side.

6. The dual-purpose brewer assembly of claim 5 including a second electromagnetic coil carried by the brew basket on the one side of the drain passageway and next to the one electromagnetic coil.

7. The dual-purpose brewer assembly of claim 6 including a third electromagnetic cod carried by the actuation arm and located on the opposite side of the drain passageway next to the other electromagnetic coil carried by the actuation arm.

8. The dual-purpose brewer assembly of claim 4 including a third electromagnetic coil carried by the actuation arm and located on the opposite side of the drain passageway next to the other electromagnetic coil carried by the actuation arm.

9. A dual-purpose brew basket assembly removably mounted to a brewer, comprising:
 a brew basket body with
  an open top,
 means adjacent the open top for removably mounting the brew basket body to the brewer, and
 a bottom with a drain passage;
 an electromagnetically controllable drain valve with an electromagnetically energizable element automatically, selectively movable when connected with the brewer and having means for selectively generating an electromagnetic field between
  an open position in which beverage in the brew basket body is enabled to flow out of the drain passageway, and
  a closed position in which the drain passageway is blocked by the drain plug to prevent flow of beverage from the brew basket body through the drain passageway; and
 a semicircular, semi-annular collar partly surrounding and partly defining the drain passageway and extending downwardly from the bottom of the brew basket protectively enclosing the electromagnetically energizable element.

10. The dual-purpose brew basket assembly of claim 9 in which
 the brew basket body has an inner wall and an outer wall adjacent the bottom of the brew basket body, and
 the drain passageway extends between the inner wall and the outer wall.

11. The dual-purpose brew basket assembly of claim 9 in which the drain plug is made at least in part from a magnetic or ferromagnetic material.

12. A dual-purpose brew basket assembly, comprising:
 a brew basket body with
  an open top, and
  a bottom with a drain passageway;
 a downwardly extending semicircular, semi-annular collar partly surrounding and partly defining a drain passageway and extending downwardly from the bottom of the brew basket and protectively enclosing an electromagnetically energizable element, the electromagnetically energizable element being half of a electromagnetic coil and the collar including a body that protectively surrounds the electromagnetically energizable element and carries electrical contacts for mating connection with mating contacts of an associated other half or the electromagnetic coil carried by a brewer to which the brew basket body is removably mounted; and
 said electromagnetically energizable element controlling a controllable drain plug movable within the drain passageway between
  an open position in which beverage in the brew basket body is enabled to flow out of the drain passageway, and
  a closed position in which the drain passageway is blocked by the drain plug to prevent flow of beverage from the brew basket body through the drain passageway.

13. The dual-purpose brew basket assembly of claim 9 in which the drain plug has an elongate body with a relatively wider head at one end and the drain passageway has a valve seat for mating sealing engagement with the drain plug.

14. The dual-purpose brew basket assembly of claim 13 in which the drain plug includes an O-ring seal carried at an underside of the bead of the drain plug.

15. The dual-purpose brew basket assembly of claim 13 in which the drain passageway has a pair of narrowed portions on opposite sides of the head to restrain the plug against removal from the drain passageway.

16. The dual-purpose brew basket assembly of claim 9 in which the drain plug is
 movable to an open position in response to generation of a local electromagnetic field, and
 movable to a closed position by the force of gravity when the local electromagnetic field is not being generated.

* * * * *